Figure 1:
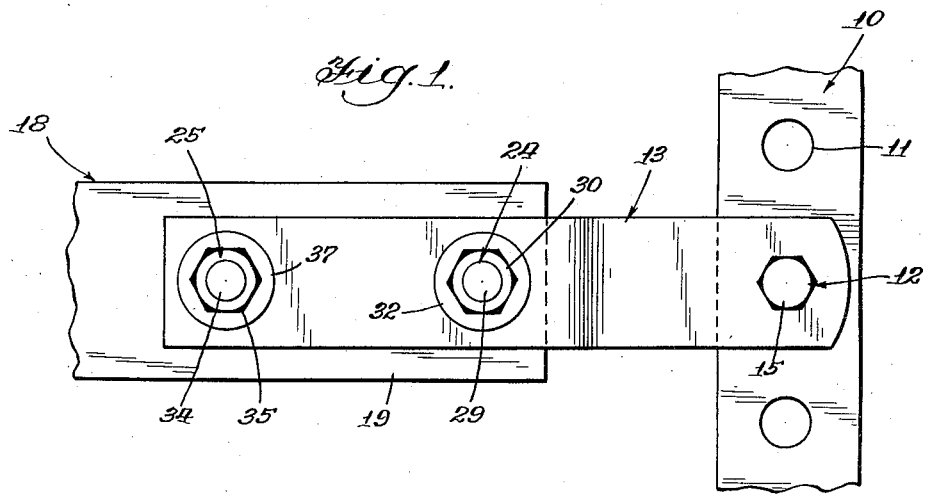

Nov. 10, 1959     J. MORKOSKI     2,912,256
VEHICLE HITCH HAVING FRICTION TYPE SURGE DAMPENER
Filed Feb. 25, 1957

Inventor
James Morkoski
Paul O. Pippel
Atty.

United States Patent Office 2,912,256
Patented Nov. 10, 1959

2,912,256

VEHICLE HITCH HAVING FRICTION TYPE SURGE DAMPENER

James Morkoski, Des Plaines, Ill., assignor to International Harvester Company, Chicago, Ill., a corporation of New Jersey Application February 25, 1957, Serial No. 642,190

4 Claims. (Cl. 280—449)

This invention relates to a new and improved surge dampener.

The joining of one vehicle to another creates many problems. No matter what speed the vehicles are to be operated when one vehicle pulls another, there is always the problem of dissipating surge from the trailing vehicle to the pulling vehicle. In the operation of farm implements where a farm tractor is pulling a trailing implement, the surge from vehicle momentum is obviously not as great as with highway traveling vehicles. However, in many implements such as hay balers, there is an inherent surge within the trailing implement caused by the reciprocating plunger in compacting bales of hay or other material therein. Here then, is a constant jarring occurring in the trailing implement which is normally imparted to the pulling tractor to cause excessive wear and eventual damage to the pulling tractor.

It is a principal object of this invention to provide a surge dampener in the hitch connection between a tractor and a trailing implement.

An important object of this invention is the provision of yieldable friction means interposed in the hitch connection between a tractor and a trailing implement in such a manner that vibrations for intermittent surges of the trailing implement are dissipated prior to transmission to the pulling tractor.

Another important object of this invention is to supply an agricultural implement such as a hay baler with a clevis mounted thereon in such a manner as to have yieldable longitudinal movement whereupon the attachment of the clevis to a tractor drawbar results in a hitch between a pulling tractor and a trailing implement which minimizes the transmission of sudden shocks or jarring within the trailing implement to the pulling tractor.

Still another important object of this invention is to equip a hitch between a pulling tractor and a trailing implement with brake lined clevis straps with yieldable pressure applied thereto to effect a cushioning of implement vibration or surge to the pulling tractor.

Other and further important objects and advantages will become apparent from the disclosures in the following specification and accompanying drawing.

Figure 2:
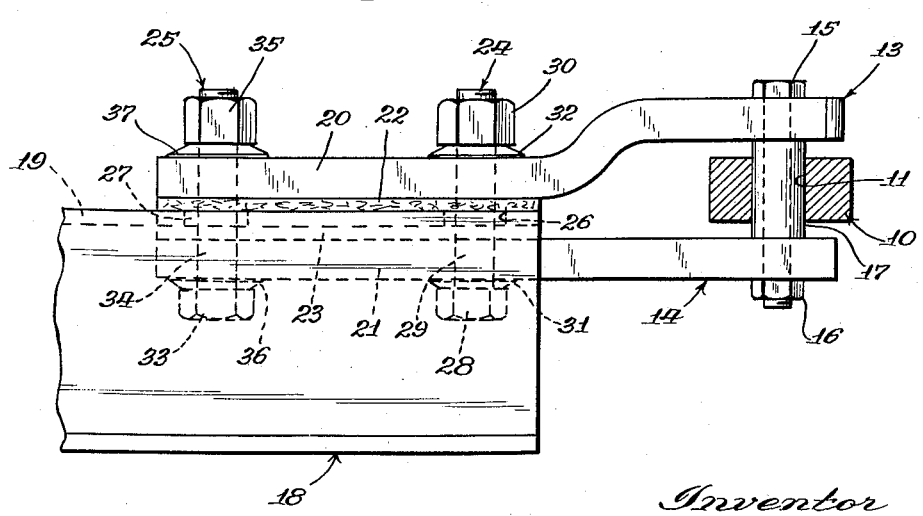

In the drawing:

Figure 1 is a top plan view of the hitch connection between a pulling tractor and a trailing implement; and Figure 2 is a side elevational view of the device as shown in Figure 1.

As shown in the drawing, the reference numeral 10 indicates generally an agricultural tractor drawbar to which trailing implements may be attached for the pulling of such implements in their operation. The drawbar 10 is generally of the type which has a considerable lateral extent and is equipped with spaced apart holes 11 therein for receiving the pin of a trailing implement. In the present situation, the pin is shown at 12 and is adapted to pass through a top clevis strap 13 and a lower clevis strap 14 with the drawbar 10 therebetween. The pin 12 is shown in the form of a bolt having a head 15 and a locking nut 16 on the bottom thereof to maintain the assembly of parts. A sleeve 17 is disposed over the shank of the bolt or pin 12 between the clevis straps 13 and 14 to provide a wear surface between the pin and the opening 11 in the drawbar 10.

The trailing vehicle or farm implement, as in the present situation, includes a tubular forward extension 18 having a top wall to which the rearward extension of the clevis straps 13 and 14 are yieldably mounted as will be hereinafter described. The rearward extensions of the clevis straps 13 and 14 are shown at 20 and 21 and they are spaced apart vertically to permit the sliding of the clevis over the top wall 19 of the forwardly extending tubular member 18 of the trailing vehicle. On the under side of the rear portion 20 of the clevis strap 13, there is provided a frictional material such as ordinarily used in the lining of brakes or the like as shown at 22. Similarly, a corresponding brake lining material is provided on the top surface of the rearward extension 21 of the clevis strap 14 as shown at 23. The brake material 22 and 23 in the form of pads or the like, snugly engage the top and lower surfaces respectively of the upper plate member 19 of the trailing implement.

Bolt members 24 and 25 are adapted to hold the clevis comprising the straps 13 and 14 to the upper plate 19 of the tubular portion 18 of the trailing implement. The bolts 24 and 25 pass through the clevis straps and their associated brake lining materials and also the intermediately disposed upper plate member 19 of the trailing implement. The plate member 19 includes longitudinally elongated openings 26 and 27 disposed at longitudinally spaced apart positions on the plate 19 to receive the respective bolt members 24 and 25. Attention now is directed to the bolt member 24 which includes a head member 28, a shank 29, and a locking nut 30 on the top side thereof. The bolt assembly 24 further includes dish or cup-shaped spring members 31 and 32. The cup-shaped springs are of the Belleville type. These springs are positioned on the underside of the clevis strap 14 and the top side of the clevis strap 13, respectively. The bolt assembly 25 includes similar parts having a bolt head 33, a bolt shank 34, a locking nut 35 at the top thereof, and intermediate cup-shaped springs 36 and 37. As in the manner of the bolt assembly 24, the Belleville type springs 36 and 37 are mounted on the underside of the clevis strap 14 and on the top side of the clevis strap 13 to thereby cause a spring pressure of the clevis straps 13 and 14 with their brake linings 22 and 23, respectively, onto the connecting plate 19 of the trailing implement.

In the operation of the device of this invention, the elongated or slotted openings 26 and 27 in the hitch part 19 of the trailing implement allow the hitch between the tractor and the trailing implement to have the surge or vibration of the trailing implement dampened or even eliminated prior to transmission to the pulling tractor. This, of course, is accomplished by the brake lining surfaces 22 and 23 engaging the upper and lower surfaces of the hitch part 19 of the trailing implement with a yieldable pressure caused by the bolt assemblies with their Belleville springs. The amount of spring pressure exerted between the brake linings 22 and 23 on the intermediate hitch part 19 can be regulated by a greater or lesser tightening of the nuts 30 and 35 onto the threaded shanks 29 and 34 of the bolt members 24 and 25.

It will be seen that herein is provided a surge dampener for the hitches between pulling tractors and trailing implements or other vehicles. Numerous details of construction may be varied throughout a considerable range without departing from the disclosures herein and I, therefore, do not propose limiting the patent granted hereon otherwise than as necessitated by the appended claims.

What is claimed is:

1. A hitch for pulling and trailing vehicles comprising a clevis, said clevis including spaced apart strap members, a plate forming part of the trailing vehicle, means yieldably attaching one end of said spaced apart clevis strap members to the plate of the trailing vehicle for limited longitudinal movement, means removably fastening the other ends of said strap members to said pulling vehicle, said means for yieldably attaching one end of said spaced apart clevis strap members including a brake lining material on the inner surfaces of each clevis strap member to frictionally engage said plate, and means yieldably urging said lined strap members into frictional engagement with said plate.

2. A device as set forth in claim 1 in which the means yieldably urging said lined strap members into frictional engagement with said plate includes said plate having an elongated slot therein, a bolt passing through the spaced apart strap members, their linings, and the intermediate plate, springs on said bolt on the outer side of each of said clevis strap member, and a nut adjustable on said bolt to regulate tension of the included springs.

3. A device as set forth in claim 2 in which the plate includes a second longitudinally spaced apart elongated slot and having a second bolt and included springs as for the first named elongated slot.

4. A device as set forth in claim 3 in which the springs are of the dish type.

References Cited in the file of this patent

UNITED STATES PATENTS

| | | |
|---|---|---|
| 391,997 | Westinghouse | Oct. 30, 1888 |
| 488,474 | Gibbs | Dec. 20, 1892 |
| 1,183,880 | Johnston | May 23, 1916 |
| 1,293,889 | O'Connor | Feb. 11, 1919 |
| 1,363,179 | Davis | Dec. 21, 1920 |
| 1,448,950 | Uecker | Mar. 20, 1923 |
| 1,848,359 | Krause | Mar. 8, 1932 |
| 2,448,744 | Strader | Sept. 7, 1948 |
| 2,574,788 | Janeway et al. | Nov. 13, 1951 |
| 2,827,987 | Williams | Mar. 25, 1958 |

FOREIGN PATENTS

| | | |
|---|---|---|
| 1,007,766 | France | Feb. 13, 1952 |
| 187,462 | Great Britain | Oct. 26, 1922 |